(12) United States Patent
Bokor et al.

(10) Patent No.: US 9,223,399 B2
(45) Date of Patent: Dec. 29, 2015

(54) TRANSLATION OF GESTURE RESPONSES IN A VIRTUAL WORLD

(75) Inventors: Brian Ronald Bokor, Raleigh, NC (US); Andrew Bryan Smith, Morrisville, NC (US); Daniel Edward House, Raleigh, NC (US); William Bruce Nicol, II, Durham, NC (US); Peter Frederick Haggar, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1760 days.

(21) Appl. No.: 12/098,252

(22) Filed: Apr. 4, 2008

(65) Prior Publication Data

US 2009/0254868 A1  Oct. 8, 2009

(51) Int. Cl.
*G06F 3/14* (2006.01)
*G06F 3/01* (2006.01)
*H04N 7/15* (2006.01)

(52) U.S. Cl.
CPC ............... *G06F 3/011* (2013.01); *H04N 7/157* (2013.01)

(58) Field of Classification Search
CPC ...................................... G06F 3/14; G06F 3/17
USPC .......... 715/200–277, 700–867; 700/701–866; 709/201–229; 705/50–79; 345/30–111; 348/206–231.9; 707/1–10, 100–104.1, 707/200–206; 706/51; 463/42
See application file for complete search history.

(56) References Cited

U.S. PATENT DOCUMENTS

| | | | |
|---|---|---|---|
| 7,814,041 B2 * | 10/2010 | Caporale et al. ................ 706/51 |
| 2004/0225640 A1 | 11/2004 | Brown et al. | |
| 2006/0003305 A1 * | 1/2006 | Kelmar ........................ 434/350 |
| 2007/0113181 A1 * | 5/2007 | Blattner et al. ............... 715/706 |
| 2008/0081701 A1 * | 4/2008 | Shuster .......................... 463/42 |
| 2009/0144639 A1 * | 6/2009 | Nims et al. .................... 715/757 |

* cited by examiner

*Primary Examiner* — Ruay Ho
(74) *Attorney, Agent, or Firm* — Esther Queen; Moore & Van Allen PLLC (57) ABSTRACT

Translating gestures made by one avatar to a second avatar in a virtual world by receiving an input from a first user representing an input gesture to be made by the first avatar to the second avatar. The input gesture is translated to generate at least one translated gesture for display. The translated gesture may be output for display as being made by the first avatar to the second avatar.

21 Claims, 4 Drawing Sheets

őTRANSLATION OF GESTURE RESPONSES IN A VIRTUAL WORLD

BACKGROUND OF THE INVENTION

The invention relates to simulations, virtual world simulations of the real-world or real-life or a virtual world and the like, and more particularly to a system and method for translating gestures transmitted between users to conform to any cultural or selected characteristics associated with the users receiving the gestures in a virtual world.

Computer based simulations are becoming more ubiquitous. Simulations may be used for training purposes, for entertainment or for other purposes. Computer simulations such as Second Life™ or similar simulations present a virtual world which allows users or players to be represented by characters known as avatars. Second Life is a trademark of Linden Research, Inc. in the United States, other countries or both. Second Life is an Internet-based virtual world launched in 2003 by Linden Research, Inc. A downloadable client program called the Second Life Viewer enables users, called "Residents", to interact with others in the virtual world through motional avatars. The virtual world basically simulates the real world or environment. The users or residents via their avatar can explore the virtual world, meet other users or residents, socialize, participate in individual and group activities, create and trade items (virtual property) and services from one another.

Virtual worlds are filled with users from many different geographic locations, different cultures, and different ethnic groups. Further, virtual worlds provide many different environments for users to interact. The diversity in users raises communications issues. A gesture presented one way in one culture may not be understood or worse, could be offensive to a user of another culture. Further, courtesy can typically be shown by altering the gesture to fit the culture of the user with whom you are interacting. Additionally, gestures may be different for different environments. For example, in a business environment a "hello" coupled with a handshake may be an appropriate gesture, whereas in a more casual environment, a "hello" coupled with a simple nod will suffice.

BRIEF SUMMARY OF THE INVENTION

In accordance with an aspect of the invention, a method for translating gestures in a virtual world may comprise receiving an input from a first user representing an input gesture to be made by a first avatar to a second avatar in the virtual world. The method may also include translating the input gesture input by the first user to generate at least one translated gesture for display.

In accordance with another aspect of the invention, a method for translating gestures in a virtual world may comprise receiving an input from a first user representing an input gesture to be made by a first avatar to a second avatar. The method may further comprise translating the input gesture to generate at least one translated gesture based on a set of translation gestures defined for use when communicating with the second avatar.

In accordance with another aspect of the invention, a method for translating gestures in a virtual world may comprise receiving an input from a first user representing an input gesture to be made by a first avatar to a second avatar in the virtual world. The method may further comprise translating the input gesture input by the first user to generate at least one translated gesture. The method may yet additionally comprise outputting for display a depiction of the gesture input by the first user as being made by the first avatar to the second avatar and outputting for display the translated gesture as being made by the first avatar to the second avatar.

In accordance with another aspect of the invention a computer program product for translating gestures in a virtual world comprises a computer readable medium having computer readable program code embodied. The computer readable medium may comprise computer readable program code configured to receive an input gesture to be made by a first avatar directed to a second avatar in the virtual world and computer readable program code configured to translate the input gesture to generate at least one translated gesture for display.

Other aspects and features of the invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the invention.

As will be appreciated by one of skill in the art, the invention may be embodied as a method, system, or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the invention may be written in an object oriented programming language such as Java, Smalltalk, C++ or the like. However, the computer program code for carrying out operations of the invention may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Aspects of the invention provide systems, methods, and computer program products for translation of gestures sent between user avatars in a virtual world. Specifically, aspects of the invention may involve receipt of a gesture from a first avatar. Some aspects, if needed, translate the gesture to an appropriate gesture for communication to a second avatar. Depending on the embodiment, the gesture is translated to comport with proper cultural, environmental, etc. settings. It may also be translated based on the identity of the avatar sending the gesture. Certain aspects of the invention translate gestures so as to more closely resemble appropriate customs and standards of each avatar.

For example, if a first avatar is European and a second avatar is Japanese, a gesture from the European representing a hand shake could be translated to a bow for the second avatar. The gesture input by the first user (shaking hands) is output for display to depict the first and second avatars shaking hands, while the translated gesture is output for display to depict the first and second avatars bowing to each other in a culturally appropriate manner.

As another example, translations of a gesture may be tailored based on a given environment in which the gesture is sent. A different translated gesture could be used based on whether the environment is formal, such as the work place, or informal, such as a social event.

As another example, translation of a gesture may be dependent on the avatar sending the gesture. The translated gesture may be different if the avatar is a friend, as opposed to a mere acquaintance.

Figure 1:
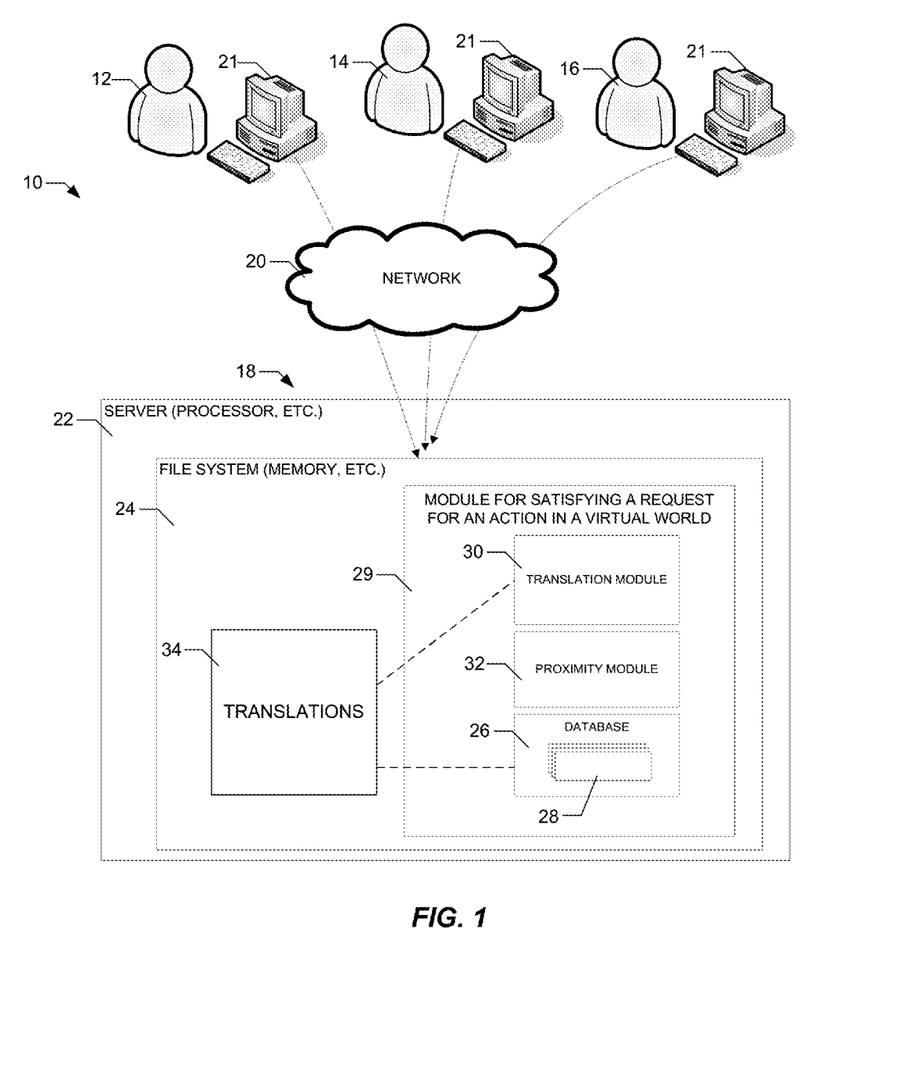
FIG. 1 is a block schematic diagram of an example of a system for translation of gestures in a virtual world in accordance with an embodiment of the invention.

FIG. 1 is a block schematic diagram depicting a general embodiment of an environment 10 in which aspects of the invention may be implemented according to at least one embodiment. As illustrated, a plurality of users 12-16 may be connected to a network 20, such as the Internet, LAN, WAN, etc. The users 12-16 interact with a virtual world system 18. In particular, the virtual world system 18 operates one or more virtual worlds in which users 12-16 may create one or more virtual personalities, sometimes referred to as avatars. The users, via their respective computers 21, are capable of controlling their avatars to communicate with each other in various virtual scenarios. In general, users provide commands to the virtual world system 18 dictating various environments and situations to place their associated avatar(s) in and to control the actions and movements of the avatar. The virtual world system 18 receives these inputs and generates various graphic user interfaces (GUIs) to be displayed on each user's computer. Where users interact with each other in the virtual world, the virtual world system 18 displays scenes from the users' interactions on both users' computers.

As illustrated, the virtual world system 18 is typically implemented as a server/processor 22 accessible via the network 20. This however, could include peer-to-peer type network configurations without a central host. (FIG. 1 depicts only one possible embodiment for configuration of the virtual world system.) The server/processor 22 operates using various software modules 29 stored in a file system 24 to create and operate the virtual world. The virtual world system 18 also includes data stored in the file system 24 typically in a database 26.

In one embodiment, the database 26 of the virtual world system 18 comprises data records 28 for each user and each avatar for each user, if the user has more than one avatar. While various pieces of information may be stored for each user and each user's avatar, for purposes of this invention, at least data are stored for each user regarding any cultural, ethnic, and/or social information associated with each avatar of the user that would dictate translation of gestures sent to the avatar.

The system 18 may further include a translation module 30 for translation of profiled gesture responses in a virtual world. In some embodiments, the system 18 further includes a proximity module 32 used to determine the proximity of avatars relative to each other in the virtual world.

Associated with the translation module 30 is a list of various gestures that may be transmitted by avatars in the virtual world. For each given gesture, there is stored one or more translation gestures that correspond to the given gesture, but are based on particular environmental, cultural, ethnicity, etc. factors or factors associated with the avatar sending the gesture. The gestures and their associated translations may be implemented in many different ways.

In some embodiments, the gestures and associated translations are stored in the database 26 accessible by the translation module 30. In this embodiment, the gestures and translations may be stored in a simple file or may be stored in a relational database. In some embodiments, the gestures and translations are in the form of a rules engine embedded in the translation module 30.

In some embodiments, the gestures and associated translations are in a general database that is common to all avatars. In other embodiments, the gestures and translations may be stored for each user and each user avatar. In these embodiments, the gestures and translations may be customized for each avatar, such that a user may define how a gesture received by the avatar is to be translated prior to display to the user.

Regardless of where and how the gestures and associated translations are stored, it is understood that the translated gestures may be defined in any number of ways and with any desired level of granularity. For example, several different translations may be stored for a given gesture. There could be different translations for the same gesture based on a social setting, such that a received gesture from a third party avatar is translated for the user based on a social situation in which the gesture was made, such as formal, e.g. business/work, or informal). Where the translations are user defined, different translations may be designated for different third party avatars. For example, translation of a gesture from a mere acquaintance may be different than translation of the gesture received from a friend.

As an example, an avatar that is based on Japanese cultural norms may have associated with it more than one translation of handshake gesture from a third party avatar. For non-designated third party avatars, (e.g., those in which a more formal interaction is presumed), the translation may be a formal bow. However, for certain designated third party avatars, such as friends or acquaintances, the handshake gesture may be translated as a nod or not translated at all and displayed as a hand shake.

Figure 2:
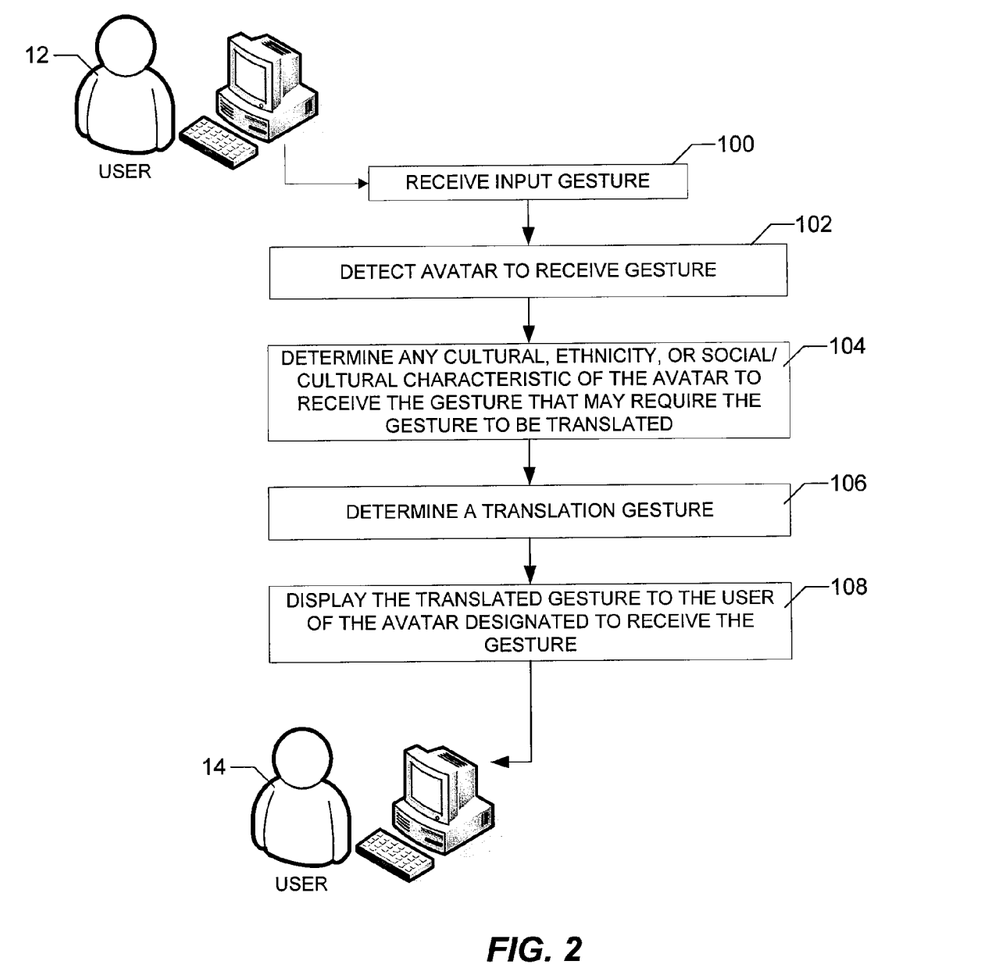
FIG. 2 is a flow chart of an example of a method for translation of profiled gestures in a virtual world where the gesture is sent from a first avatar to a designate second avatar in accordance with an embodiment of the invention.

FIG. 2 is a flow chart of an example of a method for translation of gestures from one avatar to one or more second avatars in a virtual world in accordance with an embodiment of the invention. This embodiment illustrates a situation where a first user directs a gesture from a first avatar to a second avatar. Further, in this embodiment, the invention uses a central database of translation gestures and determines which translation gesture to use based on a criterion of the second avatar, such as the avatar's defined cultural, ethnicity, or other social/cultural characteristics.

In this embodiment, a first user 12 directs an associated first avatar to communicate a gesture to a second avatar associated with a second user 14. (The second avatar could be associated with the first user, as opposed to another user.). The gesture is received by the server/processor 22 of the virtual world system 18. (See block 100). A gesture may include any visual, textual or oral communication or gesture in a virtual world that an avatar may perform or which may be performed for an avatar. Examples of a gesture may include, but are not limited to, extending a hand, bowing, saying "hello", waving, winking, writing out "hello", etc.

In this particular embodiment, the first user defines the avatar to which the gesture is directed, i.e., the second avatar. As such, the server/processor 22 also detects the indication that the gesture is directed to the second avatar. (See block 102). The user may direct the gesture in several different ways. For example, in some embodiments, the user may direct the gesture to a plurality of other avatars by designating the avatars in the command. In other embodiments, to be discussed later, the user may direct the gesture to all avatars within a certain proximity of the user's avatar by specifying a desired distance or multi-dimensional environment.

The server/processor 22 next accesses information associated with the second avatar defining any cultural, ethnicity, or other social/cultural characteristics of the avatar. (See block 104). Further, the server/processor 22 provides the gesture and the information regarding the second avatar to the translation module 30. Using the list of various gestures and associated translations 34, the translation module 30 determines an appropriate translation gesture to be sent to the second avatar based on the gesture received from the first user and the information regarding the second avatar. (See block 106).

The server/processor 22 creates proper GUIs and transmits them to the computers 21 associated with the first and second users 12 and 14, respectively for display. (See block 108). The GUIs for the first and second users may be different. The GUI displayed for the first user may depict the gesture in no translated form, while the GUI for the second user depicts the translated gesture.

For example, if the gesture input by the first user is an extended hand for a hand shake, the GUI displayed to the first user will show the first avatar with an extended hand. If the second avatar is characterized as of Japanese origin or following Japanese cultural norms, the translated gesture may be a bow. Therefore, the GUI illustrated to the second user will show the first avatar bowing.

As is understood, the second user may reply to the gesture. In this instance, the second user would command the second avatar to bow in response. This gesture would be transmitted to the first avatar and translated by the virtual world system 18 in a similar manner. As such, the GUI presented to the first user would depict the first and second avatars shaking hands, while the GUI presented to the second user would depict the first and second users bowing to each other.

FIG. 2 illustrates an embodiment in which a first user sends a gesture from a first avatar directed to a second avatar. In some embodiments, the first user may send a gesture to several avatars. In this instance, the system will repeat the retrieval, translation, and display processes (see blocks 104-108) for each avatar to receive the gesture so that gesture is properly translated and displayed to the user of each avatar in the correct manner associated with the cultural, ethnic, or other social/cultural characteristics of the avatar.

Figure 3:
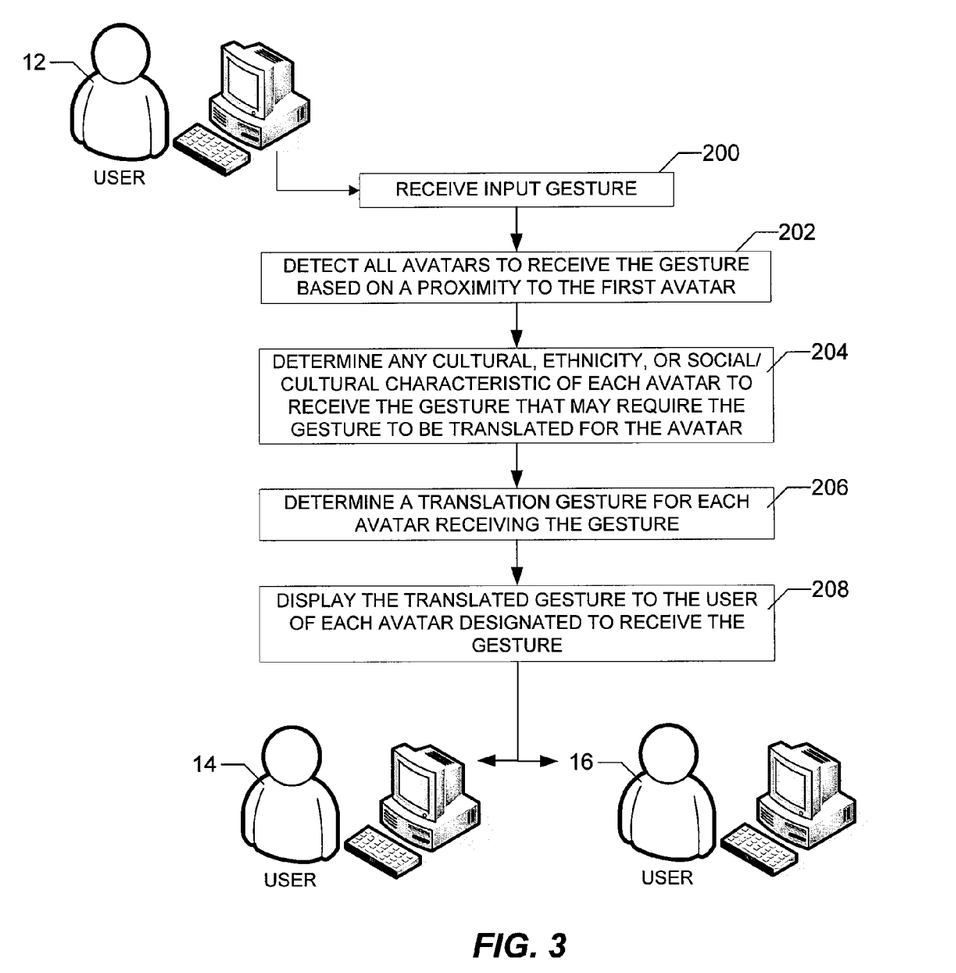
FIG. 3 is a flow chart of an example of a method for translation of profiled gestures in a virtual world where the gesture is sent from a first avatar to any second avatars located within a proximity of the first avatar in accordance with an embodiment of the invention.

Either alternatively or in addition to sending the gesture to specific avatars, the first user may send the gesture so as to be received by all users within a given proximity, such as a wave or similar gesture. With reference to FIGS. 1 and 3, in this embodiment, a first user 12 directs an associated first avatar to communicate a gesture to all second avatars within a given proximity. The proximity can be a distance or it can be a multi-dimensional spatial area, such as a sphere, or a room, etc. The gesture and the proximity are received by the server/processor 22 of the virtual world system 18. (See block 200). The proximity is provided to the proximity module 32. The proximity module determines all potential avatars located within the selected proximity of the first avatar. (See block 202).

For each second avatar, the server/processor 22 next accesses information associated with the second avatar defining any cultural, ethnicity, or other social/cultural characteristics of the avatar. (See block 204). Further, the server/processor 22 provides the gesture and the information regarding the second avatar to the translation module 30. Using the list of various gestures and associated translations 34, the translation module 30 determines an appropriate translation gesture to be sent to the second avatar based on the gesture received from the first user and the information regarding the second avatar. (See block 206).

The server/processor 22 creates proper GUIs and transmits them to the computers 21 associated with the users associated with the second avatars. The server/processor 22 also creates and transmits a GUI for display at the first user. (See block 208). The GUIs for each of the users may be different. The GUI displayed for the first user may depict the gesture in no translated form, while each of the GUIs for the second users depict the translated gesture in accordance with the translation made for each of their respective avatars.

As mentioned previously, more than one translation may be provided for a given input gesture. Different translations may be used based on the social setting, such as formal or informal, or the particular avatar sending the gesture. For example, a gesture may be translated differently based on the social setting. It may also be translated differently depending on who is sending the gesture. For example, one might expect to receive a more informal gesture from a friend than from a business colleague. As such, for some embodiments, the invention may translate the gesture based on either one or both the environment in which the gesture was made or the particular avatar making the gesture.

Figure 4:
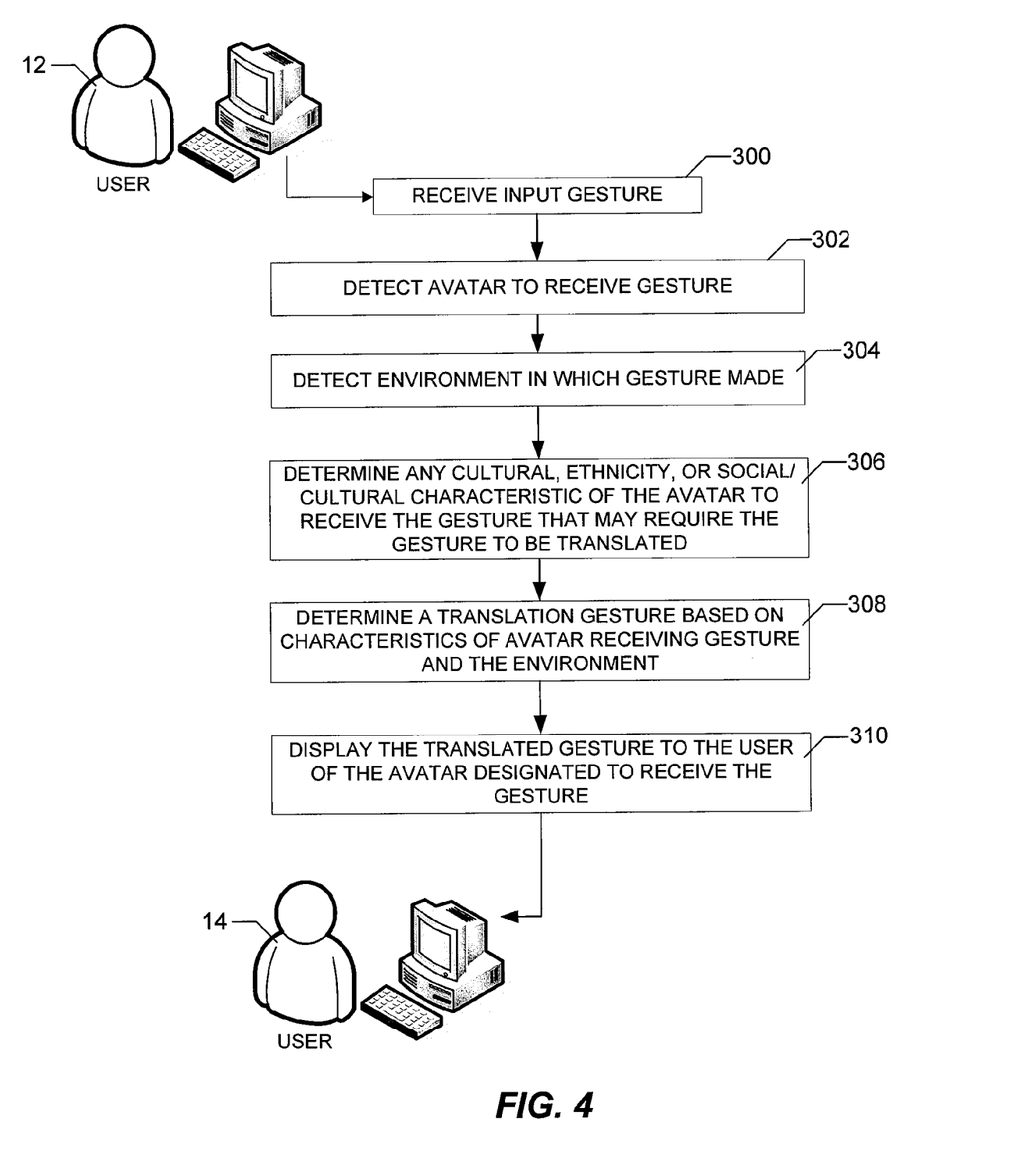
FIG. 4 is a flow chart of an example of a method for translation of profiled gestures in a virtual world where the gesture is sent from a first avatar to a second avatar within a given environment where the gesture is translated based on the environment in accordance with an embodiment of the invention.

For example, with reference to FIGS. 1 and 4, in this embodiment, a first user 12 directs an associated first avatar to communicate a gesture to a second avatar within the context of a given environment, such as formal or informal. The gesture and the environment are received by the server/processor 22 of the virtual world system 18. (See blocks 300, 302, and 304). The server/processor 22 accesses information associated with the second avatar defining any cultural, ethnicity, or other social/cultural characteristics of the avatar. (See block 306). Further, the server/processor 22 provides the gesture and the information regarding the second avatar to the translation module 30, along with the environment indication. Using the list of various gestures and associated translations 34, the translation module 30 determines an appropriate translation gesture to be sent to the second avatar based on the gesture received from the first user, the information regarding the second avatar, and the environment. (See block 308).

The server/processor 22 creates proper GUIs and transmits them to the computers 21 associated with the users associated with the second avatars. The server/processor 22 also creates and transmits a GUI for display to the first user. (See block 310). The GUIs for each of the users may be different. The GUI displayed for the first user may depict the gesture in no translated form, while each of the GUIs for the second users depict the translated gesture in accordance with the translation made for each of their respective avatars.

A similar process would be used to tailor the translation based on the individual/avatar sending the gesture. In this embodiment, using the list of various gestures and associated translations 34, the translation module 30 determines an appropriate translation gesture to be sent to the second avatar based on the gesture received from the first user, the information regarding the second avatar, and the information regarding the first avatar that sent the gesture.

As mentioned previously, in some embodiments, the gestures and associated translations are in a general database that is common to all avatars. In other embodiments, the gestures and translations may be stored for each user and each user avatar. In these embodiments, the gestures and translations may be customized for each avatar, such that a user may define how a gesture received by the avatar is to be translated prior to display to the user. Where individualized translation gestures are used, the invention would access these translation files, as opposed to a general database of translations to determine what translated gesture to display.

The first user could use the translation of gestures to translate different gestures he/she transmits without requiring the first user to make such differentiations. In some embodiments, the first user may have a customized set of translations that are used to translate command gestures send by the first user to others.

The above embodiments discuss translation of gestures in general. A gesture is meant to be any visual, textual or oral communication or gesture in a virtual world that an avatar may perform or which may be performed for an avatar. Aspects of the invention may not only be used to translate physical gestures, but also speech or text to different languages. Specifically, by adding a language translation module speech and/or text may be translated.

In the above embodiments, the various modules are described as software that is implemented by the server/processor to perform the various functions described above. In this instance, the various modules comprise computer code instructions for performing the various translation and display steps discussed above. It is understood, however, that various modules may also be a self contained systems with embedded logic, decision making, state based operations and other functions that may operate in conjunction with a virtual world simulation, such as Second Life.

The flowcharts and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the invention. The following claims are in no way intended to limit the scope of the invention to the specific embodiments described herein.

What is claimed is:

1. A method for translating gestures in a virtual world, comprising:
   receiving an input gesture to be made by a first avatar directed to a second avatar in the virtual world;
   displaying the input gesture on a first display;
   translating, using a processor, the input gesture based at least in part on one or more environmental, cultural or social factors to generate at least one translated gesture for display; and
   displaying the at least one translated gesture on a second display separate from the first display, wherein the at least one translated gesture is different than the input gesture.

2. The method of claim 1, wherein displaying the input gesture on a first display comprises outputting on the first display a depiction of the input gesture as being made by the first avatar to the second avatar.

3. The method of claim 1, wherein displaying the translated gesture on a second display comprises further comprising outputting on the second display for display the translated gesture as being made by the first avatar to the second avatar.

4. The method of claim 1, wherein translating the input to generate at least one translated gesture comprises translating the input gesture based on at least one translation gesture associated with the first avatar.

5. The method of claim 1, wherein translating the input gesture to generate at least one translated gesture comprises translating the input gesture based on at least one translation gesture associated with the second avatar.

6. The method of claim 1, wherein translating the input gesture to generate at least one translated gesture comprises translating the input gesture based on a default gesture.

7. The method of claim 1, wherein translating the input gesture to generate at least one translated gesture comprises translating the input gesture based on a virtual environment in which either the first and/or second avatar may be located.

8. The method of claim 1, wherein translating the input gesture to generate at least one translated gesture comprises translating the input gesture based on a set of translation gestures defined for use when communicating with the second avatar.

9. The method of claim 1, wherein translating the input gesture to generate at least one translated gesture comprises translating the input gesture based on a set of translation gestures associated with the first avatar.

10. The method of claim 1, wherein translating the input gesture to generate at least one translated gesture comprises translating the input gesture based on a set of translation gestures associated with the second avatar.

11. A method for translating gestures in a virtual world, comprising:
    receiving an input from a first user representing an input gesture to be made by a first avatar to a second avatar in the virtual world;
    translating, using a processor, the input gesture input, by the first user, based at least in part on one or more environmental, cultural or social factors to generate at least one translated gesture;
    outputting on a first display a depiction of the gesture input by the first user as being made by the first avatar to the second avatar; and
    outputting on a second display the translated gesture as being made by the first avatar to the second avatar, wherein the first display is separate from the second display.

12. The method of claim 11, wherein translating the input gesture input by the first user to generate at least one translated gesture comprises translating the input gesture based on at least one translation gesture associated with the first avatar.

13. The method of claim 11, wherein translating the input gesture input by the first user to generate at least one translated gesture comprises translating the input gesture based on at least one translation gesture associated with the second avatar.

14. The method of claim 11, wherein translating the input gesture input by the first user to generate at least one translated gesture comprises translating the input gesture based on a default gesture.

15. The method of claim 11, wherein translating the input gesture input by the first user to generate at least one translated gesture comprises translating the input gesture based on a virtual environment in which either the first and/or second avatar may be located.

16. A computer program product for translating gestures in a virtual world, comprising:
    a computer readable medium having computer readable program code embodied therein, the computer readable medium comprising:
    computer readable program code configured to receive an input gesture to be made by a first avatar directed to a second avatar in the virtual world;
    computer readable program code configured to display the input gesture on a first display;
    computer readable program code configured to translate the input gesture based at least in part on one or more environmental, cultural or social factors to generate at least one translated gesture for display; and
    computer readable program code configured to display the at least one translated gesture on a second display separate from the first display, wherein the at least one translated gesture is different than the input gesture.

17. The computer program product of claim 16, wherein the computer readable program code configured to display the input gesture on a first display comprises computer readable program code configured to output to the first a depiction of the input gesture as being made by the first avatar to the second avatar.

18. The computer program product of claim 16, wherein computer readable program code configured to display the at least one translated gesture on a second display comprises computer readable program code configured to output on the second display the translated gesture as being made by the first avatar to the second avatar.

19. The computer program product of claim 16, wherein said computer readable program code configured to translate the input gesture to generate at least one translated gesture for display comprises translating the input gesture based on at least one translation gesture associated with the first avatar.

20. The computer program product of claim 16, wherein said computer readable program code configured to translate the input gesture to generate at least one translated gesture for display comprises translating the input gesture based on at least one translation gesture associated with the second avatar.

21. An apparatus for translating gestures in a virtual world, comprising:
    a processor capable of:
        receiving an input gesture to be made by a first avatar directed to a second avatar in the virtual world;
        displaying the input gesture on a first display;
        translating the input gesture based at least in part on one or more environmental, cultural or social factors to generate at least one translated gesture for display; and
        displaying the at least one translated gesture on a second display separate from the first display, wherein the at least one translated gesture is different than the input gesture.

* * * * *